Feb. 13, 1940.  J. VOTYPKA  2,190,462
VEHICLE BODY
Filed July 6, 1936   6 Sheets-Sheet 1

INVENTOR.
John Votypka.
BY
Dike, Calver & Gray
ATTORNEYS.

Feb. 13, 1940.  J. VOTYPKA  2,190,462
VEHICLE BODY
Filed July 6, 1936  6 Sheets—Sheet 4

INVENTOR.
John Votypka.
BY Dike, Calvert & Gray
ATTORNEYS.

Feb. 13, 1940.  J. VOTYPKA  2,190,462
VEHICLE BODY
Filed July 6, 1936  6 Sheets-Sheet 5

INVENTOR.
John Votypka.
BY
Dike, Colver & Gray
ATTORNEYS.

Feb. 13, 1940. J. VOTYPKA 2,190,462
VEHICLE BODY
Filed July 6, 1936 6 Sheets-Sheet 6

INVENTOR.
John Votypka.
BY Dike, Calvert & Gray
ATTORNEYS.

Patented Feb. 13, 1940

2,190,462

UNITED STATES PATENT OFFICE 2,190,462

VEHICLE BODY

John Votypka, Detroit, Mich., assignor to Briggs Manufacturing Company, Detroit, Mich., a corporation of Michigan Application July 6, 1936, Serial No. 89,065

14 Claims. (Cl. 296—137)

This invention relates to vehicle bodies and particularly, although not exclusively, to automobile bodies of the type having an opening in the roof thereof controlled by means of a sliding roof panel.

An object of the invention is to provide a vehicle body of the foregoing type having an opening therein and a longitudinally slidable or adjustable roof panel supported, guided and controlled in improved relatively economical and simplified manner.

A further object of the invention is to provide improved means for sealing the roof opening against the leakage of water past the sliding panel when in closed position.

A still further object is to provide improved means cooperating with the marginal edges of the sliding panel for holding the same under spring tension against vibration as well as lateral and vertical displacement and at the same time providing an efficient weather seal when the roof panel is closed.

Another object of the invention is to provide improved operating mechanism for adjusting the roof panel longitudinally and improved supporting and mounting means for said mechanism.

Other objects of this invention will appear in the following description and appended claims, reference being had to the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated certain present preferred embodiments of the invention as applied to an automobile body of the cab type having a metal roof A including curved cover sheet comprising side roof panels 20 and a rear panel 21, the roof being provided with a generally rectangular opening at its top which is adapted to be closed by means of a permanent top roof section 22 arranged in the front portion of the roof opening and a sliding metal roof panel 23 adapted to close the opening in rear of the permanent roof section 22. In the present instance, the opening in the roof controlled by the sliding panel 23 is at the rear of the body although it will be understood that the body may be constructed so that the sliding panel 23 will control an opening located at the front portion of the roof.

Figure 6:
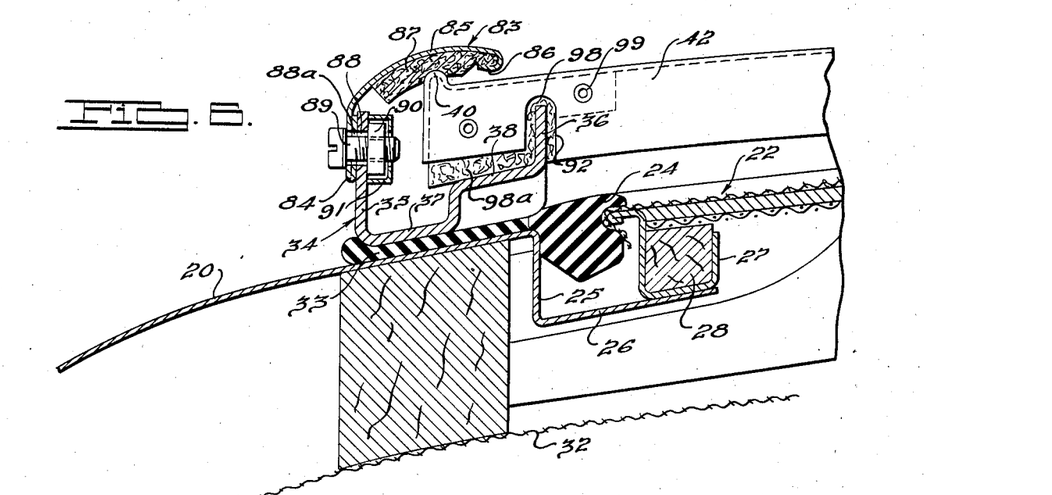
Fig. 6 is an enlarged detail section taken through lines 6—6 of Fig. 1 in the direction of the arrows.
Figures 13, 14, 15, 16:
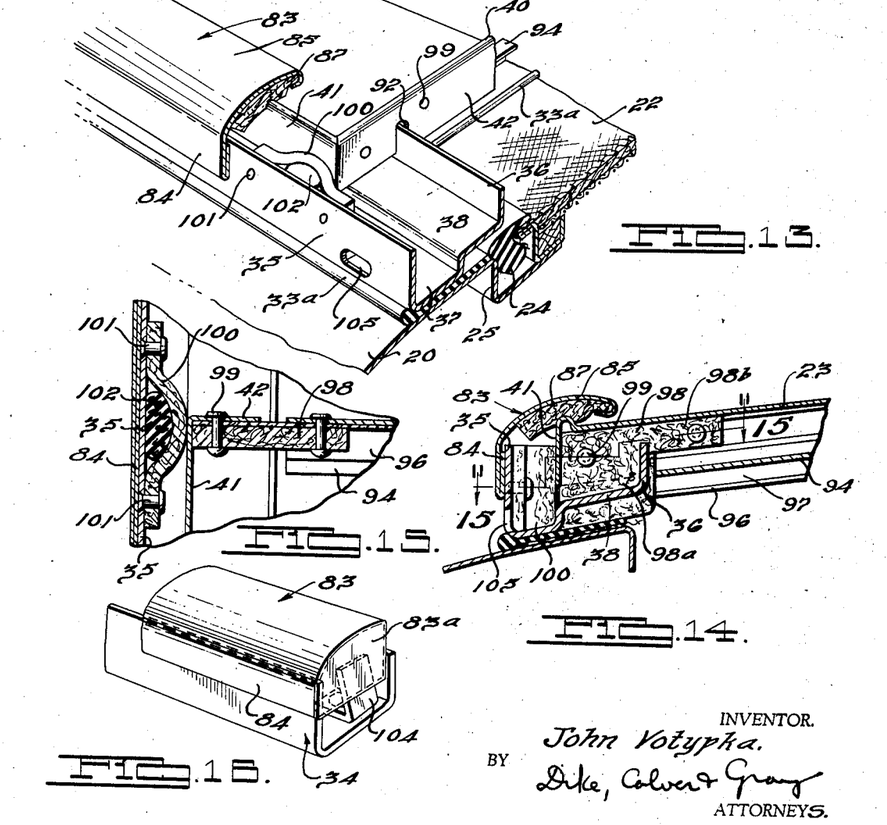
Fig. 13 is a fragmentary perspective view, partly in section, taken through lines 13—13 of Fig. 1 in the direction of the arrows.
Fig. 14 is an enlarged detail section taken through lines 14—14 of Fig. 1 in the direction of the arrows.
Fig. 15 is a detail section taken through lines 15—15 of Fig. 14.
Fig. 16 is a fragmentary perspective view of the forward end of the gutter.

The permanent top roof section 22 may be formed either from a metal stamping or may be of composite non-metallic material, the latter being shown, by way of example, in the present instance. This roof section is of conventional construction and, as shown in Figs. 6 and 13, is sealed within the roof opening along its marginal side and front edges by means of a rubber sealing strip 24 interposed between the roof section 22 and the upper turned edge of the side roof panels 20. The side and front roof panels, as shown, are downwardly flanged at 25 around the margin of the roof opening and thence provided with inwardly directed flanges 26, and secured to the latter by welding are channels 27 carrying tacking strips 28 to which the fabric or composite roof section 22 is secured.

Figures 3, 4, 5:
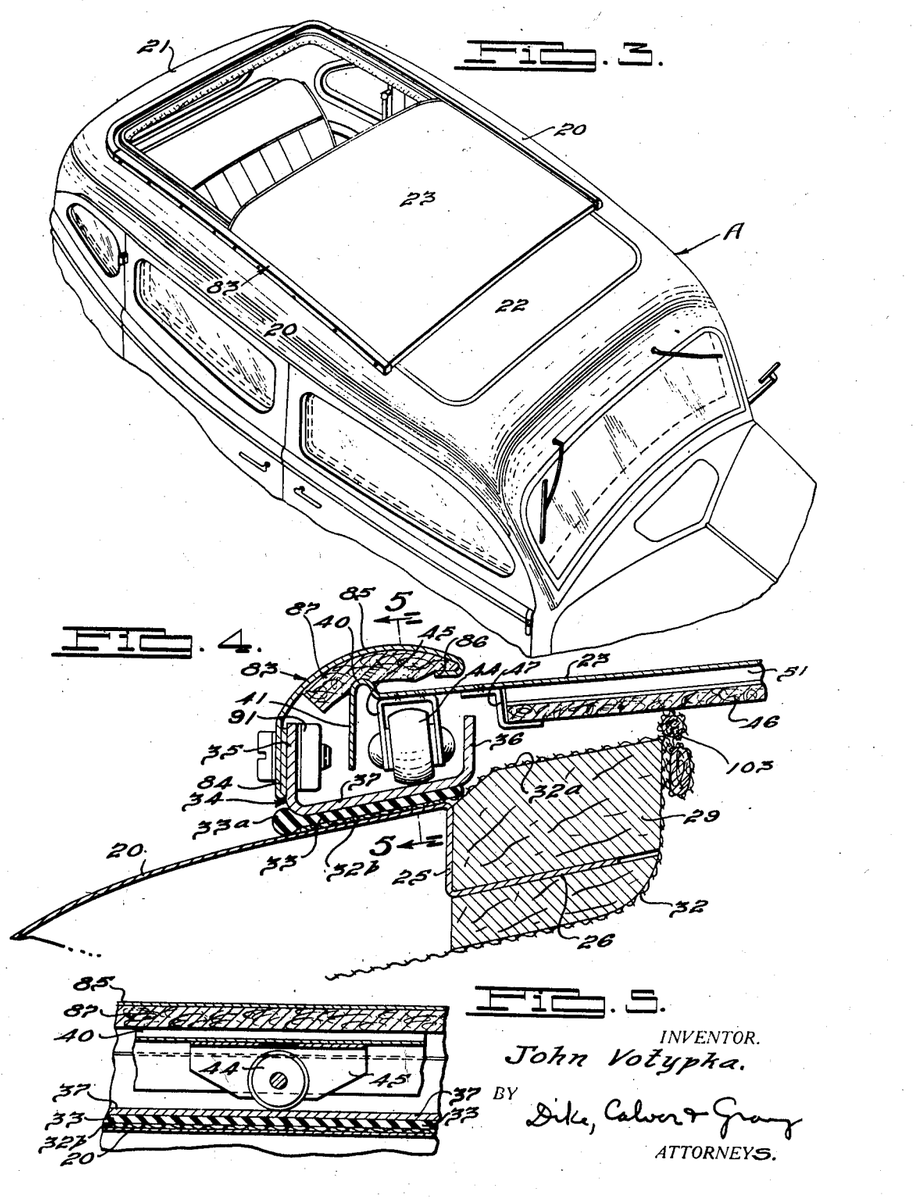
Fig. 3 is a view similar to Fig. 1 illustrating the sliding roof panel in open position.
Fig. 4 is an enlarged detail transverse section taken through lines 4—4 of Fig. 1 in the direction of the arrows.
Fig. 5 is a detail section taken through lines 5—5 of Fig. 4 in the direction of the arrows.
Figures 7, 8:
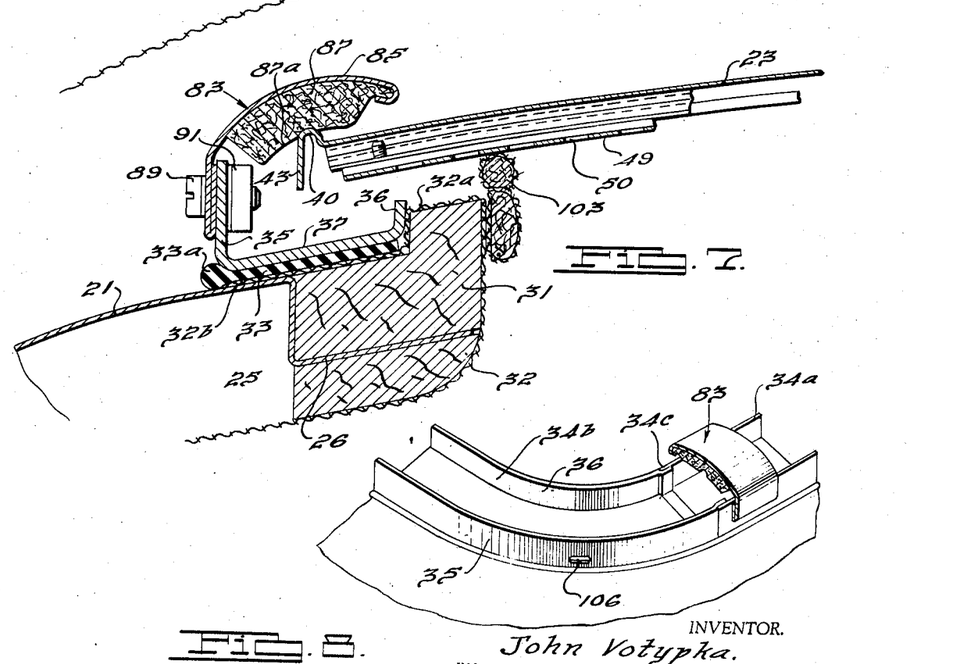
Fig. 7 is an enlarged detail section taken through lines 7—7 of Fig. 1 in the direction of the arrows.
Fig. 8 is a fragmentary perspective view, partly in section, taken from line 8—8 of Fig. 1 in the direction of the arrows.

Within the roof opening in rear of the permanent roof section 22 is mounted a generally rectangular wood frame comprising longitudinal side members 29 (Fig. 4), a front cross-member or bow 30 along the front transverse edge of this opening (Fig. 9), and a rear transverse member 31 (Fig. 7). The sections 29, 30 and 31 of this wood frame are supported upon the horizontal flanges 26 of the roof panels 20 and 21 as shown in Figs. 4 and 7 and are rigidly secured in place to said flanges.

The side walls and top portions of the roof within the interior of the passenger compartment, which is located below the rear opening in the roof, is upholstered by means of suitable material 32, see Figs. 4 and 7, which may, for example, consist of water-proofed imitation leather, and as shown the head lining material 32 extends around the upper marginal edge of the roof opening, being drawn back at 32a and extending outwardly as shown at 32b so as to overlie a substantial marginal portion of the roof panels 20 and 21. The portion 32b of the material is cemented to the metal panels 20 and 21. Thus, the material 32 entirely covers the wood framing 29 and 31 and since it extends well over the joint between said wood frame members and the flanges 25 and is cemented to the top of the metal panels, it effects a preliminary seal against the leakage of water into the body. Extending along the longitudinal sides and rear edge of the opening and overlying the edge portions 32b of the material 32 is a continuous flat rubber sealing strip 33 terminating at its outer edge in a marginal bead 33a. This sealing strip is securely cemented to the material 32b and to the roof panels 20 and 21, as shown in Figs. 4 and 7, and overlies the joint between the framing 29, 31 and the metal roof panels. The rubber sealing strip 33 is of elastic or pliable rubber composition adapted to be compressed somewhat to effect a desirable water-tight seal.

Mounted upon the sealing strip 33 is a three-sided U-shaped channel frame 34. In the present instance, this frame comprises longitudinal side members 34a and a rear transverse member 34b, see Fig. 8, formed to overlap the rear ends of the side members and welded thereto to provide a substantially integral water-tight joint 34c. The channel frame 34 is securely fastened down to the side roof panels 20 and to the end frame member 31 by screws so as to compress somewhat the rubber sealing strip 33 and effect a water-tight joint, the bead 33a assisting materially in sealing the parts against the ingress of water. The longitudinal side members of the channel 34 each comprises outer and inner vertical side flanges or walls 35 and 36 joined by a generally horizontal bottom web 37 forming with said walls a continuous gutter around three sides of the roof opening. The bottom web 37 is provided through a predetermined portion of its length with a raised or offset track portion 38, Figs. 6, 13 and 14. This offset portion varies in height and in the present instance diminishes in height toward the rear of the channel sections until it merges into the flat bottom web 37 as shown in Fig. 4. This offset in the gutter varies the path of movement of the roof panel relative to the normal line of the gutter, compensating for or modifying the roof curve to produce either a true arc of travel or a rectilinear path of travel as desired, the former being produced in the present instance. The flange 36 of the channel section 34b at the rear end of the roof opening, as shown in Figs. 7 and 8, is cut down in height in order to provide clearance for the sliding roof panel 23.

Figures 1, 2:
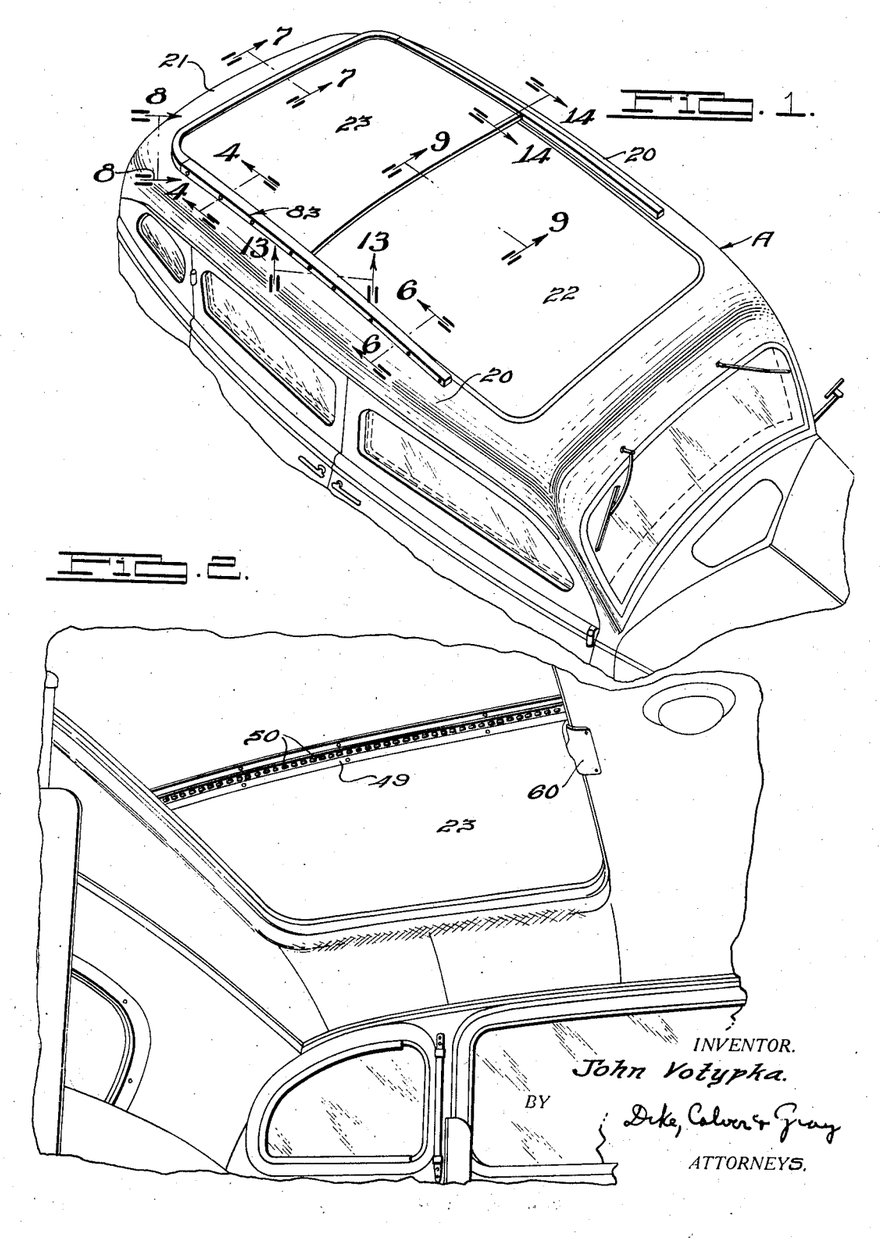
Fig. 1 is a fragmentary perspective view illustrating the roof of an automobile body wherein the present invention is incorporated.
Fig. 2 is a fragmentary inside perspective view of the vehicle body illustrating the sliding roof panel in closed position.
Figure 12:
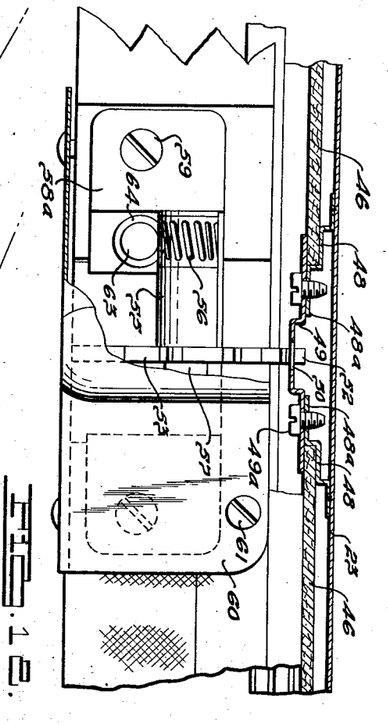
Fig. 12 is a fragmentary sectional elevation taken through lines 12—12 of Fig. 9 in the direction of the arrows.

The sliding lid or roof panel 23 comprises a one-piece stamped or pressed metal sheet generally rectangular in shape and having formed therein around the four marginal edges thereof a continuous unbroken upstanding curved bead or rib 40 forming a part of a downturned vertical flange extending continuously around the four sides of the panel. This flange comprises longitudinal sections 41, a front transverse section 42 (Figs. 13 and 14) and a rear transverse section 43 (Fig. 7). Mounted along each longitudinal side of the sliding panel 23 and confined within the flanges or skirts 41 are a series of anti-friction rollers 44. Any suitable number may be provided, such as three, at each side of the panel. Each roller 44 is journalled in the vertical side flanges of a U-shaped bracket 45 spot-welded to the panel 23, Fig. 4. The inner face of the metal panel 23 is concealed by means of suitable trim panels 46 (Figs. 4 and 12). Each panel may comprise a foundation sheet of fiber-board or the like covered on its inner face with suitable upholstery material such as imitation leather, fabric or the like. Each trim panel 46 is supported along its outer edge by means of suitable Z-shaped metal retainer clips 47 spot-welded to the lid panel 23 (Fig. 4) and the inner longitudinal edges are engaged by means of suitably shaped metal strips 48 also spot-welded to the roof panel 23. In the present instance, these retainer strips 48 are zig-zag in cross-section and have terminal horizontal flanges 48a spaced apart and spanned by means of a longitudinal metal strip 49 overlapping the flanges 48a and secured thereto as by metal screws 49a. The central portion of the strip 49 is pressed into shallow channel shape and punched to provide a series of holes 50 thereby forming a rack extending longitudinally and centrally of the lid 23, as shown in Fig. 2. The metal strips 48 and 49 provide reinforcement for the roof panel 23, and additional crosswise reinforcement is provided by means of shallow alined channel strips 51 (Fig. 4) which are spot-welded to the roof panel 23 and which intersect and are secured to the longitudinal strips 48.

Figures 9, 10, 11:
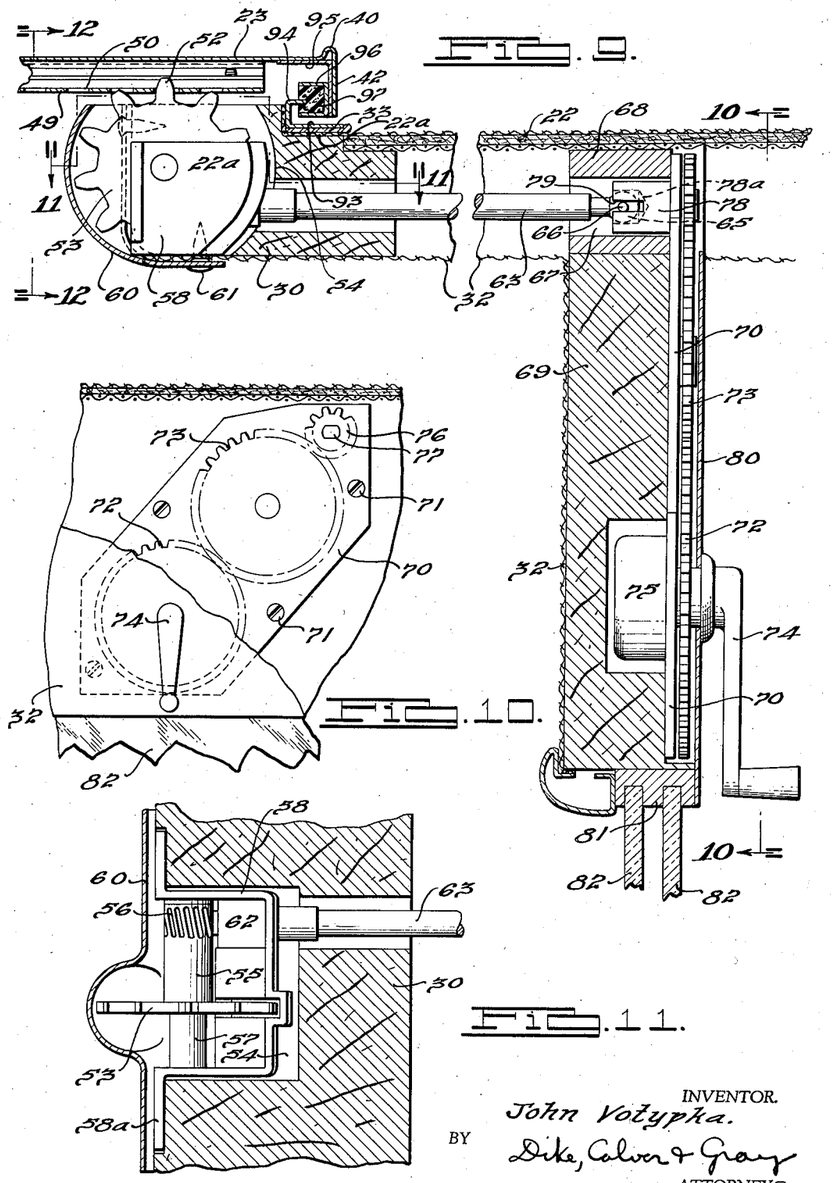
Fig. 9 is an enlarged vertical section taken through lines 9—9 of Fig. 1 in the direction of the arrows.
Fig. 10 is a fragmentary sectional elevation taken through lines 10—10 of Fig. 9 in the direction of the arrows.
Fig. 11 is a fragmentary horizontal section taken through lines 11—11 of Fig. 9 in the direction of the arrows.

Cooperating with the rack 49, the teeth of which are produced by means of the perforations 50, are the teeth 52 of a gear 53 (Figs. 9-12). Fixed to one face of the gear 53 is a hollow or tubular shaft section 55 projecting laterally therefrom and having worm teeth 56 cut in the end thereof. The gear 53 and shaft section 55 are journalled on a fixed shaft 57 secured at its ends to the side walls of a U-shaped metal casing 58, the latter being housed within an opening 54 cut in the transverse roof bow 30. The casing 58 terminates in out-turned flanges 58a secured to the member 30 by screws 59 (Fig. 12). The casing 58 and the mechanism enclosed thereby is concealed by means of a removable metal cover plate 60 of curved or arcuate shape as shown in Fig. 9, this cover plate being secured to the member 30 by screws 61 and being readily removable to permit access to the mechanism within the casing 58 for servicing purposes.

Journalled within a bearing block 62 carried by the casing 58 and supported thereby is the rear end of a shaft 63 having worm teeth 64 cut peripherally at the rear end thereof, said teeth meshing with the worm 56 on the tubular shaft 55 whereby the gear 53 may be rotated from the shaft 63. The shaft 63 extends forwardly beneath the roof section 22, being concealed by the head lining material 32, and the forward end of the shaft is turned down and machined to provide a ball or head 65 having a transverse pin 66 fixed therein and projecting at opposite sides thereof. This end of the shaft extends into an opening 67 in a cross-bow 68 to which the depending partition wall 69 is secured, the latter forming a portion of the dividing partition between the driver's compartment in the front of the cab and the passenger compartment in the rear thereof.

As shown in Figs. 9 and 10, the regulator mechanism for driving the shaft 63 is mounted on the forward side of the partition wall 69 so as to be readily accessible for manipulation by the driver of the vehicle. The regulator mechanism in the present instance comprises a metal mounting plate 70 removably secured to the wood partition member 69 by screws 71. Rotatably mounted on the plate 70 are a pair of meshing gears 72 and 73, the former being driven by means of a crank handle 74. Mounted on the back face of the plate 70 is a housing 75 containing a suitable friction clutch mechanism operable to lock the shaft of the gear 72 in any angular position thereof, the construction of this friction clutch, which may be of any well known type, being such as to permit the gearing to be driven by turning the handle 74 but locking the gearing by friction against movement when a longitudinal force is applied to the lid 23. Meshing with the gear 73 is a pinion 76 secured to a short shaft or spindle 77 journalled in the mounting plate 70. This shaft projects through the plate and is fastened to or forms a part of a tubular coupling member 78 adapted to rotate with the shaft of the pinion 76. The coupling 78 at its terminal end is slotted at diametrically opposite sides at 79 to receive the projecting ends of the coupling pin 66, the member 78 having a socket 78a to receive the head or ball 65 at the terminal end of the shaft 63. The regulator mechanism, including the gearing and mounting plate, are concealed by means of a removable cover plate 80, the shaft of the crank arm 74 projecting therethrough as shown in Fig. 9. Secured to the lower edge of the partition 69 is a guide strip 81 grooved to provide a pair of parallel glass runway channels to receive the sliding glass panels 82 separating the drivers compartment from the passenger compartment.

From the foregoing it will be seen that the regulator assembly, including the gearing and other parts carried by the mounting plate 70, is readily detachable with respect to the shaft 63 and the mechanism driven thereby for moving the sliding roof panel. Hence, in production the roof panel and its operating mechanism within the casing 58 and the shaft 63 may be fully assembled and thereafter at a later step in the assembly line the regulator mechanism on the mounting plate 70 may be installed in position since the coupling of the shaft 63 therewith merely requires the sliding engagement of the part 78 with the parts 65 and 66. With this construction simiplicity in servicing of the operating mechanism is afforded since the regulator mechanism may be readily removed without disturbing the remainder of the roof operating mechanism.

It will be seen that the sliding roof panel 23 is mounted through anti-friction rollers 44, which may be of fiber or other composition material, to travel on tracks 37, 38 at the bottom of the longitudinal gutter or channel members 34, the construction of the latter being such as to cause the lid panel to slide longitudinally in a rectilinear path into and out of position to close the roof opening. The sliding roof panel is retained in vertical position and the rollers tensioned against the tracks by means of flexible or yieldable retainer caps or cover strips 83. These strips or members are of hood-like construction adapted to overhang and cover the gutters 34. The retainer member 83 may comprise longitudinal sections and a transverse end section rigidly fastened together end to end by welding to provide substantially a continuous U-shaped or three-sided frame. With reference to Figs. 4 and 6 to 8 inclusive, it will be seen that the member 83 comprises a pressed metal strip having its outer vertical edge folded back upon itself to provide a wall 84 of double thickness. The strip also comprises an arched hood portion 85 overhanging the gutter 34 and terminating at its inner edge in a return bent flange 86 within which is confined one edge of a compressible sealing and insulating strip 87 extending continuously from one end to the other of the U-shaped strip 83. The weatherstrip 87 may, if desired, be composed of material, such as felt, which is preferably waterproofed and also impregnated with a suitable lubricant, such as graphite or grease, to reduce friction. As shown in Fig. 6, the outer vertical side 84 of the retainer strip is provided with a series of holes 88a adapted to register with corresponding holes 88 in the flange 35 of the gutter and the parts are secured together by means of bolts 89 and nuts 90 housed within sheet metal cages 91. It will be seen that the apertures 88, 88a have materially larger diameters than the diameter of the shank of the bolt 89 and that the sealing strip 87 engages the upstanding bead 40 of the sliding roof panel. Thus, after the strip 83 has been secured by the bolt 89 to the flange 35 it may be adjusted vertically with respect to the bead 40 by a blow from a hammer, for example, thus embedding the bead 40 in the material 87 to the desired extent to provide an effectively tight seal and at the same time to prevent undue resistance to the longitudinal adjustment of the roof panel 23. The overhanging portion 85 of the retainer strip also functions as a spring which in conjunction with the compressible material 87 acts to tension the sliding roof panel and prevent chattering or vibration. The overhanging portion 85 may also be adjusted with respect to the bead 40 by blows from a hammer applied along the inner edge thereof effective to bend it slightly toward the roof and thus assist in securing the proper pressure against the bead 40. If desired adjustment of the retainer strip 85 with respect to the flange 35 may be obtained by loosening and bodily adjusting the bolt and nut assembly 89, 90. As will be clearly seen from Fig. 7, an effective seal is also provided between the bead 40 and the sealing strip 87 at the rear of the roof since the final rearward movement of the sliding panel 23 forces the bead 40 into the sloping face 87a of the strip 87.

Referring to Figs. 6, 9 and 13 to 15 inclusive, the front end flange 42 of the sliding roof panel is slotted at 92 to receive the flanges 36 of the gutter at opposite sides thereof. The rear flange 43 is slotted in like manner. As seen in Fig. 9, the outer water-proofed covering of the roof section 22 extends beneath the transverse rubber sealing strip 33 which is cemented thereto and mounted on this strip is a transverse metal channel strip 93 screwed down tightly against the rubber sealing strip 33 to the wood cross-bow 30. The channel 93 has a forwardly extending sealing flange 94 which faces the inner side of the roof panel flange 42 when the latter is closed. Along the front inner side of the sliding roof panel is mounted, as by spot-welding, a reinforcing metal angle 95 and spot-welded to the lower edge of this angle and also to the flange 42 is a transverse channel strip 96 facing rearwardly and carrying a sealing strip 97. In the present instance, the latter comprises sponge rubber although other suitable yieldable or pliable sealing material may be used. The flange 94 faces the sealing strip 97 so that when the roof panel is fully closed the flange embeds itself in the material 97, thus providing an effective water-tight seal. A supplementary seal around the slots 92 is also provided by means of an L-shaped strip 98 of material, such as water-proofed felt, riveted at 99 to the flange 42. This strip is slotted to receive the flange 36 and to closely hug opposite faces thereof. The strip also has a portion 98a which engages and wipes the bottom 38 of the gutter and a portion 98b projecting inwardly and providing a snug fit between the channel strip 96 and the roof panel.

As shown in Figs. 14 and 15, a weather seal is provided between the outer upright flange 35 of the gutter and the vertical side flange 41 of the sliding roof panel. This weather seal is located at a point substantially opposite the front flange 42 of the roof panel when the latter is in fully closed position and comprises a strip of pliable material, such as water-proofed and lubricated felt 100, secured by rivets 101 to the inner face of the gutter flange 35. Intermediate the rivets the strip is bowed or bulged inwardly to fill the space between the flanges 35 and 41, this being accomplished by means of a core or plug 102 of compressible material such as sponge rubber. The weather seal 100, in addition to closing the channel between the flanges 35 and 41, also functions to position the roof panel laterally during its sliding movement, it being understood that devices 100—102 are provided at opposite sides of the roof panel and one or more along its length as desired. The strips 100 snugly engage the flanges 41, the contact being sufficiently tight to hold the rubber plug 102 in compressed or partially flattened condition. As a result, the roof panel is held against vibration in all positions thereof. As shown in Figs. 4 and 7, the space between the trim panel 46 and the frame members 29, 31 is closed by means of a flexible wind cord 103 which yieldingly engages the panel 46 thereby preventing drafts.

Referring to Fig. 16, it will be seen that the forward terminal ends of the tension strips 83 are closed by means of vertical end flange portions 83a which overlie the upper portions of the gutters 34, the lower portions thereof being open to permit water to drain out. Angle members 104 are spot-welded or otherwise secured to the forward terminal ends of the gutter members 34 to provide abutments for limiting the travel of the sliding roof panel at wide open position. Suitable drain holes in the outer walls of the gutter members may be provided to permit any water entering the gutter to flow out. In the present instance, drain holes 106 of suitable size are formed in the base of the flange 35 at the rear corners of the gutters (Fig. 8) and additional drain holes 105 are provided in the walls or flanges 35 slightly in advance of the sliding roof panel when in closed position, see Fig. 13.

Figure 17:
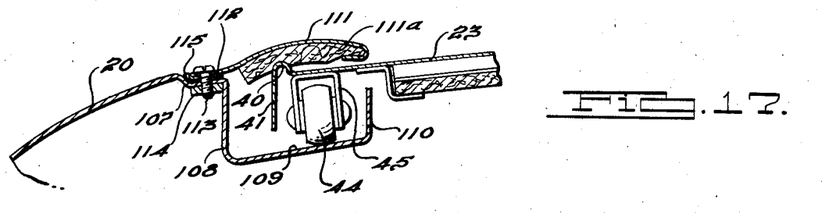
Fig. 17 is a fragmentary transverse section illustrating a modification.

Referring to the embodiment illustrated in Fig. 17, in this instance there is provided a construction in which the sliding roof panel 23 lies substantially flush with the inner margin of the side panels 20 as well as the end panel 21. As illustrated, the inner edge of the panel 20, as well as the panel 21, is pressed to provide a depressed portion or groove 107 extending around three sides of the roof opening. Thence the metal panels 20 and 21 are flanged downwardly at 108, inwardly at 109 and then upwards at 110 to provide gutter members which are overlapped by the sliding roof panel 23. The rollers 44 travel on the webs 109 as hereinbefore described. The tension strip 111 extends continuously around three sides of the roof opening and overlies the roof panel 23 in the same manner as the strip 83 and carries sealing strips 111a similar to the sealing strips 87 which engage under spring tension the marginal bead 40 of the roof panel. The outer edge of the strip 111 is folded back upon itself at 112 and secured within the depression or groove 107 by screws 113, a continuous rubber sealing strip 115 being interposed between the folded edge 112 and the base of the groove 107.

Figure 18:
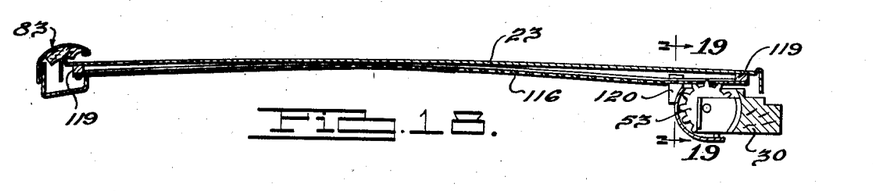
Fig. 18 is a longitudinal section showing a modified form of rack construction.
Figure 19:
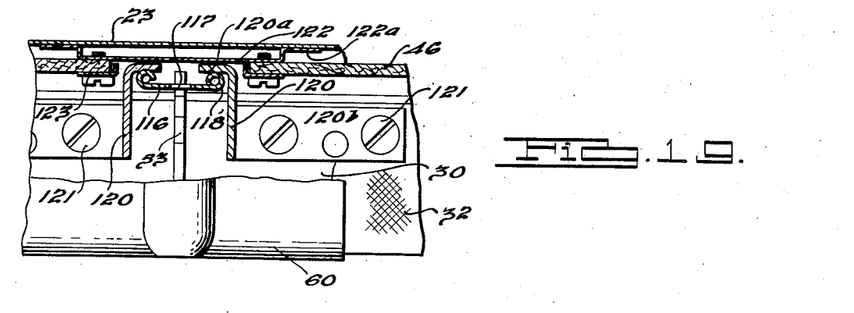
Fig. 19 is an enlarged section through lines 19—19 of Fig. 18.

Referring to the embodiment illustrated in Figs. 18 and 19, in this instance the rack engaged by the gear 53 is supported in somewhat different manner. The rack comprises a metal strip 116 having perforations 117 forming the teeth of the rack which are engaged by the teeth of the gear 53. The opposite longitudinal edges of the strip 116 are coiled back upon lengths of wire as shown at 118 and the opposite ends of the strip 116 are secured to the metal roof panel 23 through the medium of blocks 119. Intermediate these points the rack 116 is free of attachment to the roof panel. Adjacent but somewhat in rear of the gear 53 are brackets 120 having inwardly directed flanges 120a which overlie and are engaged by the coiled edges 118 of the rack, the brackets having flanges 120b secured at 121 to the wood cross-bow 30. A channeled metal reinforcing strip 122 extends centrally from front to rear of the roof panel and has side flanges 122a spot-welded to the panel. The inner edges of the trim panels 46 are clamped to the strip 122 by clips 123 secured in place by suitable screws. From this construction it will be seen that only the front and rear ends of the rack are fastened to the sliding roof panel 23. The rack is engaged by the teeth of the gear 53 at a point intermediate the front support 119 and the overlying flanges of the bracket 120. The engagement of the gear with the rack between these points is such as to place the strip 116 under tension thereby insuring constant mesh of the sprocket with the rack and eliminating chattering or vibration between the intermeshed parts.

Figure 20:
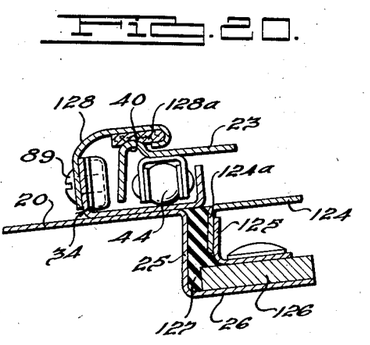
Figs. 20 and 21 are transverse roof sections illustrating further modified forms.
Figure 21:
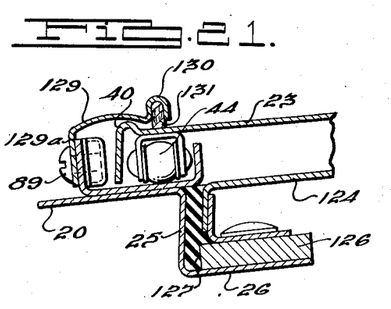

In Figs. 20 and 21 it will be seen that the sliding roof construction is applied to an all-metal roof. A permanent metal roof panel 124 replaces, in this embodiment, the roof section 22 and has a downwardly directed marginal flange 124a secured to angle members 125 which in turn are secured through strips 126 to the roof flanges 26. Rubber sealing strips 127 are interposed between the flanges 25 and 124a. The sliding roof panel 23 and gutter members 34 are substantially the same as previously described. The tension strips 128 differ somewhat in design from the strips 83 but are secured for adjustment to the outer walls of the gutter members by screws 89 in the same way as above described. The overhanging tension strips 128 also carry sealing strips 128a of the same material as the strips 87 which engage under spring tension the marginal ribs 40 of the roof panel. The construction shown in Fig. 21 differs from the structure of Fig. 20 in respect to the design and arrangement of the overhanging tension strip 129. The strip through its outer depending flange 129a is secured for vertical adjustment to the outer wall of the gutter member by screws 89 in the same mannner as previously described. The top of the strip 129 is arched to clear the bead 40 and terminates along its inner edge around three sides of the roof opening in an upstanding inverted channel shaped rib 130 having the channel thereof opening downwardly. Within the channel 130 and clamped or pinched between the side walls thereof in a sealing strip 131 extending continuously around the longitudinal sides and rear end of the roof panel 23 and yieldingly pressed against the panel 23 inwardly of the bead or rib 40. The material of the strip 131 may be the same as the strip 87 and by adjustment of the tension retainer strip 129 in the manner previously described in respect to the strip 83 the sealing strip 131 may be pressed under the proper degree of spring tension against the roof panel.

It will be noted that when the rof panel moves into fully closed position the flange 94 embeds itself in the compressible material 97 which not only effects a seal but also tends to hold the front end of the panel against vibration. At the same time the rib 40 at the rear end of the panel (Fig. 7) is forced into engagement with the compressible but relatively compact liner material 87 which, due to its wedge or inclined shape acts to force or draw down the rear end of the sliding panel by wedging action, thus effecting a seal and holding down the panel firmly against vibration. It will also be noted that the compressible rubber strips 33 not only act as a seal but also as a noise and vibration dampening or deadening medium which effect is aided by the composition or fiber rolls 44.

I claim:

1. In a vehicle body having a roof opening and a longitudinally slidable roof panel movable into and out of position to close the opening, said panel having marginal downwardly directed flanges along the sides and ends thereof, channel shaped gutters receiving said longitudinal flanges, rollers slidingly supporting the panel in said gutters, said end flanges having guide slots receiving the inner upright walls of the gutters whereby portions of said end flanges extend into said gutters, and non-metallic sealing members secured to the inner sides of said end flanges and sealing the space between the flanges and the bottom of the gutters.

2. In a vehicle body having a roof opening and a longitudinally slidable roof panel movable into and out of position to close the opening, said panel having marginal downwardly directed flanges along the sides and ends thereof, channel shaped gutters receiving said longitudinal flanges, rollers slidingly supporting the panel in said gutters, said end flanges having guide slots receiving the inner upright walls of the gutters whereby portions of said end flanges extend into said gutters, and non-metallic sealing members secured to the inner sides of said end flanges and sealing the space between the flanges and the bottom of the gutters and also cooperating to seal said guide slots.

3. In a vehicle body, a roof structure comprising a cover sheet having therein an opening of a substantially rectangular shape, a depending angular flange integrally formed on the edges of said cover sheet around at least three sides of said opening, a frame supported by said flange substantially flush with said cover sheet, and a headlining covering the interior of the body and secured to said frame around all four sides thereof.

4. In a vehicle body, a roof structure comprising a cover sheet having therein an opening of a substantially rectangular shape, an integral depending flange on said sheet around at least three sides of said opening, an inwardly extending flange portion on the lower edges of said flange forming an angle therewith, and a substantially rectangular frame fitted into said angle and coextensive with a substantial portion of said opening.

5. In a vehicle body, a roof structure comprising a cover sheet having therein an opening of a substantially rectangular shape, an integral depending flange on said sheet around at least three sides of said opening, inwardly extending flange portions on the lower edges of said flange forming an angle therewith, a substantially rectangular frame fitted into said angle substantially flush with said cover sheet and defining the margins of a skylight opening.

6. In a vehicle body, a roof structure comprising a cover sheet having therein an opening of a substantially rectangular shape, an integral depending flange on said sheet around at least three sides of said opening, inwardly extending flange portions on the lower edges of said flange forming an angle therewith, a substantially rectangular frame fitted into said angle substantially flush with said cover sheet and occupying substantially one-half of said opening, and a permanent panel fitted substantially flush with said cover sheet to cover the remaining portion of said opening.

7. In a vehicle body, a roof structure comprising a cover sheet having therein an opening of a substantially rectangular shape, an integral depending flange on said sheet around at least three sides of said opening, inwardly extending flange portions on the lower edges of said flange forming an angle therewith, a substantially rectangular frame fitted into said angle substantially flush with said cover sheet and occupying substantially one-half of said opening, a headlining covering the interior of the body and brought around said frame and secured thereto, and a permanent panel supported by said flanges substantially flush with said cover sheet and fitted to close the remaining portion of said opening.

8. In a vehicle body, a roof structure comprising a cover sheet having therein an opening of a substantially rectangular shape, an integral depending flange on said sheet around at least three sides of said opening, inwardly extending flange portions on the lower edges of said flange forming an angle therewith, a substantially rectangular frame fitted into said angle substantially flush with said cover sheet and occupying substantially one-half of said opening, a headlining covering the interior of the body and brought around said frame and secured thereto, a permanent panel of substantially rectangular shape supported at its three sides by said flange portions and around its fourth side by said frame, said panel being fitted to close the remaining portion of said opening, and a resilient sealing strip between said cover sheet and said panel around the three sides thereof.

9. In a vehicle body, a roof structure comprising a cover sheet having therein an opening of a substantially rectangular shape, a depending angular flange integrally formed on the edges of said cover sheet around at least three sides of said opening, a frame supported by said flange substantially flush with said cover sheet, a headlining covering the interior of the body and secured to said frame, and a panel supported by said cover sheet movable to open and to close selectively the opening of said frame.

10. In a vehicle body, a roof structure comprising a cover sheet having therein an opening of a substantially rectangular shape, a depending angular flange integrally formed on the edges of said cover sheet around at least three sides of said opening, a frame supported by said flange substantially flush with said cover sheet, a headlining covering the interior of the body and secured to said frame, guide channels provided along the sides of said opening and supported by said cover sheet, and a panel movable in said channel to open and to close selectively the opening defined by said frame.

11. In a vehicle body, a roof structure comprising a cover sheet having therein an opening of a substantially rectangular shape, a depending angular flange integrally formed on the edges of said cover sheet around at least three sides of said opening, a frame supported by said flange substantially flush with said cover sheet, a headlining covering the interior of the body and secured to said frame around all four sides thereof, guide channels provided along the sides of said opening, a frame supported by said flange a panel movable in said channel to open and to close selectively the opening defined by said frame, and members secured to said channels and having continuous spring flanges overlying the side edges of said panel and resiliently holding down the same.

12. In a vehicle body, a roof structure comprising a cover sheet having therein an opening of a substantially rectangular shape, a depending angular flange integrally formed on the edges of said cover sheet around at least three sides of said opening, a frame supported by said flange substantially flush with said cover sheet, a headlining covering the interior of the body and secured to said frame, guide channels provided along the sides of said opening and supported by said cover sheet, a panel movable in said channel to open and to close selectively the opening defined by said frame, members secured to said channels and having continuous spring flanges overlying the side edges of said panel and resiliently holding down the same, and a sealing strip between said spring flanges and said panel edges to effect a seal therebetween.

13. In a vehicle body, a roof structure comprising a cover sheet having therein an opening of a substantially rectangular shape, a depending angular flange integrally formed on the edges of said cover sheet around at least three sides of said opening, a frame supported by said flange substantially flush with said cover sheet, a headlining covering the interior of the body and secured to said frame around all four sides thereof, guide channels provided along the sides of said opening and supported by said cover sheet, a panel movable in said channel to open and to close selectively the opening defined by said frame, a channel secured to said cover sheet and extending along the sides and one end of said opening, a continuous spring flange carried by said channel and overlying the side edges of said panel in all positions thereof and one end edge of said panel in the closed position thereof to hold said panel down resiliently, and a non-metallic strip secured to said spring flange to facilitate sliding of said panel and to effect a seal around the three sides of said panel in the closed position thereof.

14. In a vehicle body a roof structure comprising a cover sheet having therein an opening of a substantially rectangular shape, a depending angular flange integrally formed on the edges of said cover sheet around at least three sides of said opening, a frame supported by said flange substantially flush with said cover sheet, a headlining covering the interior of the body and secured to said frame around all four sides thereof, guide channels provided along the sides of said opening and supported by said cover sheet, a panel movable in said channel to open and to close selectively the opening defined by said frame, a channel secured to said cover sheet and extending along the sides and one end of said opening, a continuous spring flange carried by said channel and overlying the side edges of said panel in all positions thereof and one end edge of said panel in the closed position thereof to hold said panel down resiliently, a non-metallic strip secured to said spring flange to facilitate sliding of said panel and to effect a seal around the three sides of said panel in the closed position thereof, a downwardly extending flange along the edge of the fourth side of said movable panel, and a sealing strip adapted to be compressed by said downwardly extending flange to provide a seal along the same.

JOHN VOTYPKA.